United States Patent
Jin et al.

(10) Patent No.: US 11,846,222 B2
(45) Date of Patent: Dec. 19, 2023

(54) SYSTEMS AND METHODS FOR CONDITIONING AN AFTERTREATMENT SYSTEM USING AN ELECTRIC MACHINE TO DRIVE A COMBUSTION ENGINE

(71) Applicant: Cummins Inc., Columbus, IN (US)

(72) Inventors: Xing Jin, Columbus, IN (US); Lisa A. Orth-Farrell, Columbus, IN (US); Gary C. Salemme, Columbus, IN (US); Manik Narula, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/790,411

(22) PCT Filed: Jan. 29, 2021

(86) PCT No.: PCT/US2021/015615
§ 371 (c)(1),
(2) Date: Jun. 30, 2022

(87) PCT Pub. No.: WO2021/155088
PCT Pub. Date: Aug. 5, 2021

(65) Prior Publication Data
US 2023/0082857 A1 Mar. 16, 2023

Related U.S. Application Data

(60) Provisional application No. 62/967,919, filed on Jan. 30, 2020.

(51) Int. Cl.
*F01N 3/20* (2006.01)
*B60W 10/06* (2006.01)
*F01N 9/00* (2006.01)

(52) U.S. Cl.
CPC ........... *F01N 3/2006* (2013.01); *B60W 10/06* (2013.01); *F01N 3/2066* (2013.01); *F01N 9/00* (2013.01);
(Continued)

(58) Field of Classification Search
CPC .... B60W 10/06; F01N 3/2006; F01N 3/2066; F01N 3/208; F01N 3/035; F01N 9/00;
(Continued)

(56) References Cited

U.S. PATENT DOCUMENTS 7,854,114 B2  12/2010  England
9,194,311 B2  11/2015  Shane
(Continued)

FOREIGN PATENT DOCUMENTS

WO   2007050366 A2   5/2007
WO   2018165438 A1   9/2018

OTHER PUBLICATIONS

International Search Report and Written Opinion for International patent application No. PCT/US2021/015615, filed Jan. 29, 2021, dated May 6, 2021.

*Primary Examiner* — Mickey H France
*Assistant Examiner* — Dapinder Singh
(74) *Attorney, Agent, or Firm* — Faegre Drinker Biddle & Reath LLP

(57) ABSTRACT

Systems and methods for conditioning an aftertreatment system. For example, a computer-implemented method for conditioning an aftertreatment system of a hybrid system including an electric motor and a combustion engine includes: determining whether the aftertreatment system is in a first temperature zone below a first temperature threshold; determining whether a power demand corresponding to the operation of the hybrid system is in a first power demand zone below a power threshold; and if the aftertreatment system is determined to be in the first temperature zone and the power demand of the hybrid system is determined to be in the first power demand zone, setting the hybrid system to compressor mode to heat the aftertreatment system.

17 Claims, 4 Drawing Sheets

(52) U.S. Cl.
CPC ....... *F01N 2430/10* (2013.01); *F01N 2590/11* (2013.01); *F01N 2900/08* (2013.01); *F01N 2900/1602* (2013.01)

(58) Field of Classification Search
CPC ............ F01N 2430/10; F01N 2560/06; F01N 2590/11; F01N 2900/08; F01N 2900/1602; Y02T 10/12; Y02T 10/40; Y02T 10/62
See application file for complete search history.

(56) References Cited

U.S. PATENT DOCUMENTS

| | | | |
|---|---|---|---|
| 9,803,527 B2 | 10/2017 | Pappenheimer | |
| 10,138,833 B1 | 11/2018 | Kurtz | |
| 11,118,552 B2 * | 9/2021 | Pursifull | F02D 13/0261 |
| 2005/0182553 A1 | 8/2005 | Miller et al. | |
| 2010/0307440 A1 | 12/2010 | Ma et al. | |
| 2012/0090294 A1 | 4/2012 | Sujan et al. | |
| 2016/0318508 A1 | 11/2016 | Aoki | |
| 2019/0234272 A1 * | 8/2019 | Harmsen | F02M 26/04 |
| 2020/0224614 A1 * | 7/2020 | Hu | F02B 37/10 |

* cited by examiner

SYSTEMS AND METHODS FOR CONDITIONING AN AFTERTREATMENT SYSTEM USING AN ELECTRIC MACHINE TO DRIVE A COMBUSTION ENGINE

CROSS-REFERENCE TO RELATED APPLICATIONS

This application claims priority to International Patent Application No. PCT/US2021/015615, filed Jan. 29, 2021, which claims priority to U.S. Provisional Patent Application No. 62/967,919 filed on Jan. 30, 2020, the entire contents of which are incorporated herein by reference.

FIELD OF THE DISCLOSURE

Certain embodiments of the present disclosure are directed to hybrid vehicles. More particularly, some embodiments of the disclosure provide methods and devices for conditioning an aftertreatment system with an electric machine.

BACKGROUND OF THE DISCLOSURE

With increasing efforts in limiting greenhouse gas emissions from transportation, regulations regarding internal combustion engines are increasingly stringent, in particularly in the metric of nitric oxides (NOx) emissions. Vehicle electrification has been considered as one promising way to meet the regulations. However, for a modern hybrid system, a significant amount of NOx is generated during engine cold start, during which an aftertreatment system is ineffective. The aftertreatment system often includes a selective catalytic reduction (SCR) system. In order to meet future low NOx emission standards required by regulations, it is desirable to have systems and methods for conditioning an aftertreatment system to reduce NOx emissions from a hybrid system, especially during the cold start of the combustion engine.

BRIEF SUMMARY OF THE DISCLOSURE

In various embodiments, a computer-implemented method for conditioning an aftertreatment system of a hybrid system including an electric motor and a combustion engine includes determining whether the aftertreatment system is in a first temperature zone below a first temperature threshold; determining whether a power demand corresponding to the operation of the hybrid system is in a first power demand zone below a power threshold; and if the aftertreatment system is determined to be in the first temperature zone and the power demand of the hybrid system is determined to be in the first power demand zone, setting the hybrid system to compressor mode to heat the aftertreatment system.

In various embodiments, a conditioning system for conditioning an aftertreatment system of a hybrid system including an electric motor and a combustion engine includes a temperature zone determining module configured to determine whether the aftertreatment system is in a first temperature zone below a first temperature threshold; a power demand determining module configured to determine whether a power demand corresponding to the operation of the hybrid system is in a first power demand zone below a power threshold; and a mode-setting module configured to, if the aftertreatment system is determined to be in the first temperature zone and the power demand of the hybrid system is determined to be in the first power demand zone, set the hybrid system to compressor mode to heat the aftertreatment system.

In various embodiments, a non-transitory computer-readable medium with instructions stored thereon, that when executed by a processor, cause the processor to perform determining whether an aftertreatment system is in a first temperature zone below a first temperature threshold, the aftertreatment system is of a hybrid system including an electric motor and a combustion engine; determining whether a power demand corresponding to the operation of the hybrid system is in a first power demand zone below a power threshold; and if the aftertreatment system is determined to be in the first temperature zone and the power demand of the hybrid system is determined to be in the first power demand zone, setting the hybrid system to compressor mode to heat the aftertreatment system.

DETAILED DESCRIPTION OF THE DISCLOSURE

Certain embodiments of the present disclosure are directed to hybrid vehicles. More particularly, some embodiments of the disclosure provide methods and devices for conditioning an aftertreatment system with an electric machine. In some embodiments, conditioning is achieved by warming up the aftertreatment system.

Figure 1:
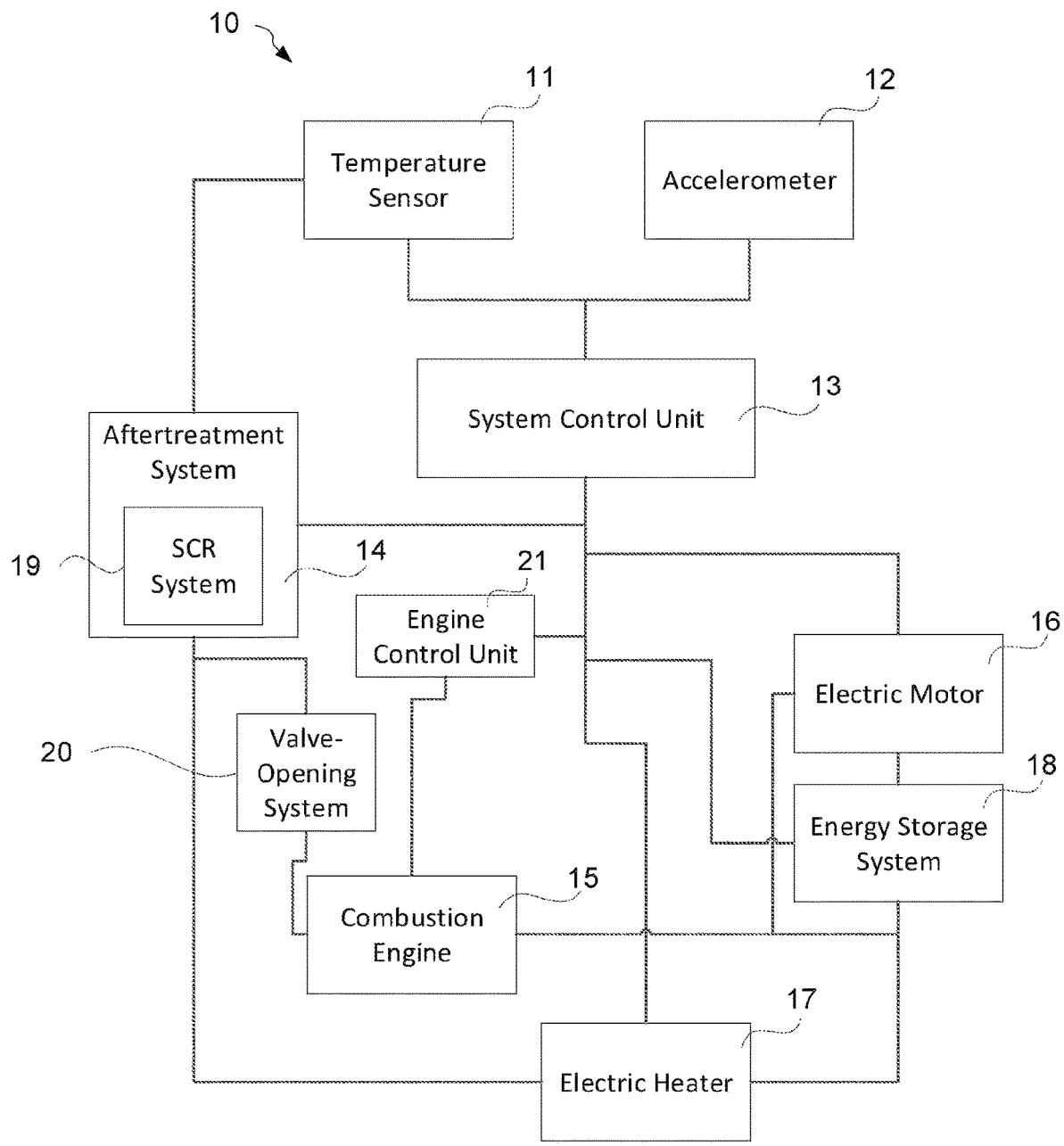
FIG. 1 is a simplified system diagram depicting a hybrid system 10, according to some embodiments of the present disclosure.

FIG. 1 is a simplified system diagram depicting a hybrid system 10, according to some embodiments of the present disclosure. The hybrid system 10 may be a hybrid engine system of a hybrid vehicle and includes a temperature sensor 11, an accelerometer 12, a system control unit (SCU) 13, an aftertreatment system 14, a combustion engine 15, an electric motor 16, an electric heater 17, and an energy storage system 18. The temperature sensor 11 (e.g., a physical or a virtual sensor) may be configured to determine a system temperature of the aftertreatment system 14. The accelerometer 12 (e.g., a vehicle throttle) may be configured to determine an acceleration of the vehicle. SCU 13 may be configured to house a conditioning system (see FIG. 4) and to implement a method (see FIG. 2) for conditioning the aftertreatment system 14 (e.g., via switches and/or actuators) by controlling the combustion engine 15, the electric heater 17, and the electric motor 16. SCU 13 may include a mode-setting module configured to change the mode of the combustion engine 15, the mode of the electric motor 16, and/or the mode of the electric heater 17. The aftertreatment system 14 is configured to convert greenhouse molecules (e.g., NOx) to non-greenhouse molecules (e.g., $H_2O$) and may include a selective catalytic reduction (SCR) system 19. The hybrid system 10 may further include a valve-opening system 20 configured to open to enable heated air to pass from the combustion engine 15 to the aftertreatment system 14. Although valve-opening system 20 is shown as a separate component, valve-opening system 20, or portions thereof, may be incorporated with combustion engine 15, e.g. an exhaust valve. The combustion engine 15 (e.g., a two-strokes engine or a four-strokes engine) is configured to, under control of SCU 13 (e.g., via an engine control unit 21), provide power to accelerate the vehicle, to run as a compressor to provide heated air to the aftertreatment system 14, and optionally to provide energy for charging the energy storage system 18. The electric motor 16 is configured to provide power to accelerate the vehicle and to drive (e.g. rotate the crankshaft) the combustion engine 15 when in a compressor mode. The electric heater 17 (e.g., an exhaust heater or an electric catalyst heater) is configured to, optionally, provide heat to the aftertreatment system 14. The energy storage system 18 (e.g., a battery, a fuel cell, a supercapacitor, a flow cell) is configured to provide electric power to the electric motor 16 and is connected to the SCU 13 to enable SCU 13 to monitor a charge status of the energy storage system.

Figure 2:
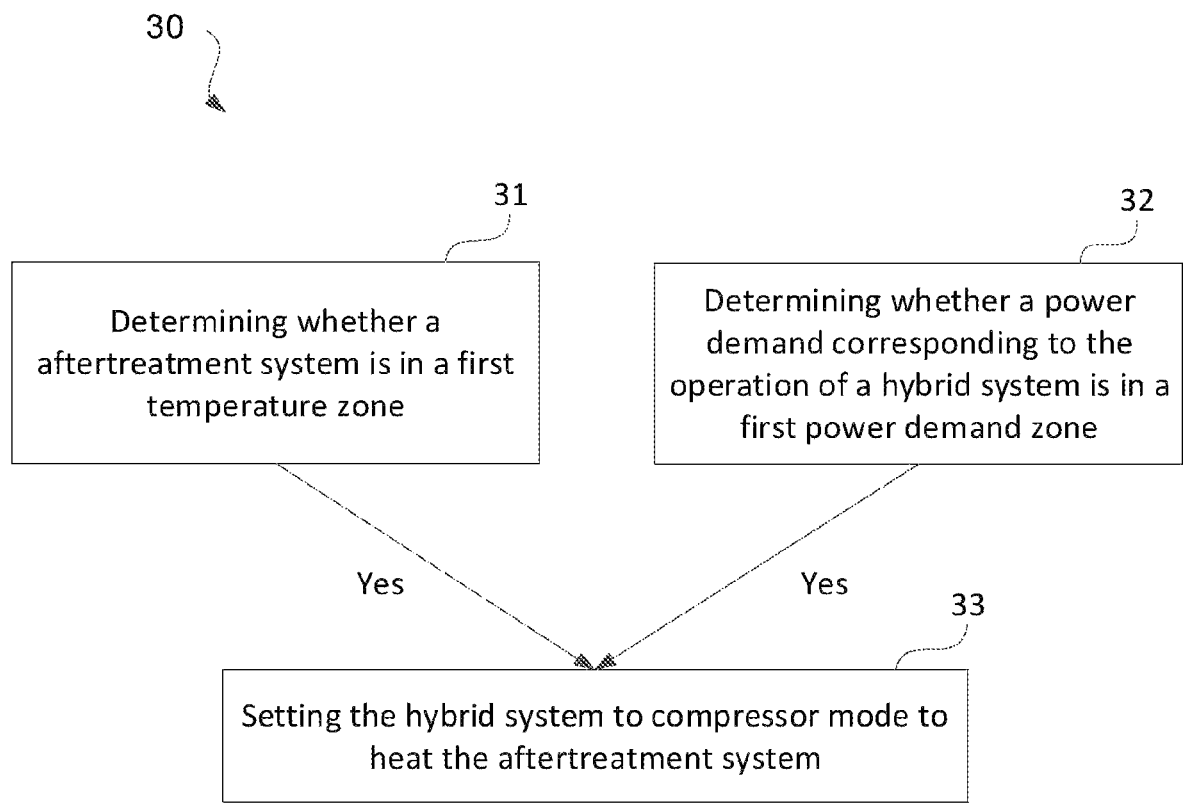
FIG. 2 is a simplified flowchart showing a method 30 for conditioning an aftertreatment system, according to some embodiments of the present disclosure.

FIG. 2 is a flowchart of a method 30 for conditioning an aftertreatment system (e.g., the aftertreatment system 14), according to some embodiments of the present disclosure. The method 30 includes, at 31, determining whether the aftertreatment system is in a first temperature zone, at 32, determining whether a power demand corresponding to the operation of a hybrid system (e.g., hybrid system 10) is in a first power demand zone, and at 33, setting the hybrid system to compressor mode to heat the aftertreatment system.

Figure 3:
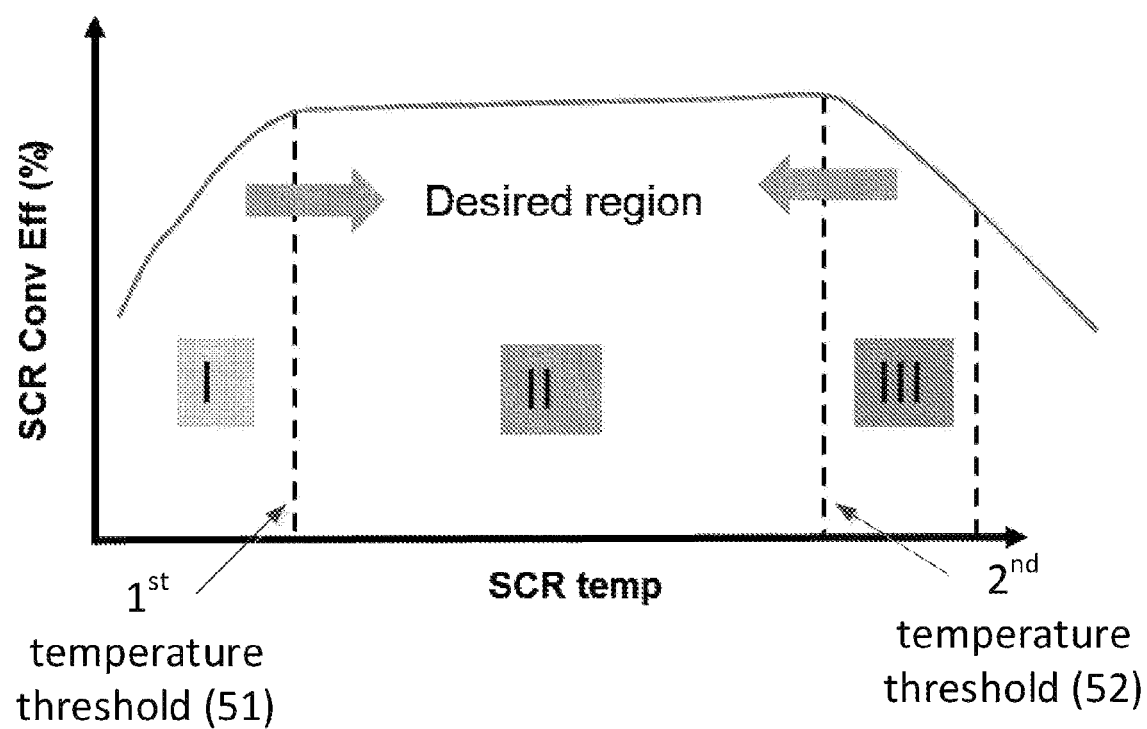
FIG. 3 is a graph depicting an efficiency vs. temperature relationship of a selective catalytic reduction system (SCR) of an aftertreatment system.

At 31, determining whether the aftertreatment system is in a first temperature zone includes measuring the system temperature using a temperature sensor (e.g., temperature sensor 11) or receiving a measured temperature of the aftertreatment system (e.g., aftertreatment system 14). The system temperature may be the temperature of a SCR system (e.g., SCR system 19) of the aftertreatment system. Determining the system temperature zone includes comparing the system temperature to thresholds that determine the boundaries of the zones. In one example, there are three zones defined by two thresholds. As illustrated in FIG. 3, the system temperature zone is a first temperature zone if the system temperature is below a first temperature threshold 51, the system temperature zone is a second temperature zone if the system temperature is between the first temperature threshold 51 and a second, higher, temperature threshold 52, and the system temperature zone is a third temperature zone if the system temperature is above the second temperature threshold 52. The second temperature zone may include a temperature in which the SCR system operates at optimal conversion efficiencies. Additional thresholds may be incorporated to define additional temperature zones. In certain embodiments, the method 30 further includes determining a conversion efficiency of the aftertreatment system or of the SCR system of the aftertreatment system. For example, determining the conversion efficiency includes looking up an efficiency vs temperature look-up-table, which may correspond to an efficiency vs. temperature curve as shown in FIG. 3.

At 32, determining whether a power demand corresponding to the operation of a hybrid system (e.g., hybrid system 10) is in a first power demand zone includes determining an acceleration input of the vehicle in which the hybrid system is installed. For example, determining the power demand to be zero, in a first power demand zone below a power threshold and greater than zero, or in a second power demand zone greater or equal to the power threshold. The acceleration input may correspond to movement of an accelerator pedal or may be deduced based on sensed movement, for example with an accelerometer (e.g., accelerometer 12), which may be connected to sense motion of the accelerator pedal or the vehicle. For example, the vehicle is not accelerating when power demand is determined to be zero, the vehicle is accelerating at a slow acceleration when power demand is determined to be in the first power demand zone, and the vehicle is accelerating at a high acceleration when power demand is determined to be in the second power demand zone.

To help avoid cold start, during which the aftertreatment system 14 of a hybrid system 10 is ineffective, the SCU 13 provides instructions in accordance with the method 30 based at least in part on to the system temperature and power demand, to the combustion engine 15, the electric motor 16, and/or the electric heater 17 of the hybrid system 10 to warm up the aftertreatment system 14. For example, when the system temperature is low (e.g., below the first temperature threshold of FIG. 3), the electric heater is instructed by the SCU 13 to switch on to heat the aftertreatment system. If the power demand is zero or small (e.g., in a first power zone below a power threshold), the SCU 13 sets electric motor 16 to drive combustion engine 15 as a compressor and operates the valve-opening system 20 to enable flow of heated air from the combustion engine 15 to heat the aftertreatment system 14.

At 33, setting the hybrid system (e.g., hybrid system 10) to compressor mode is performed if the aftertreatment system (e.g., aftertreatment system 14) is determined to be in the first temperature zone and the power demand of the hybrid system is determined to be in the first power demand zone. In some examples, at 33, setting the hybrid system to compressor mode includes using an system control unit (e.g., SCU 13) of the hybrid system to control one or more clutches of the vehicle, the combustion engine, the electric motor, the heater, and/or a valve. In some examples, setting the hybrid system to compressor mode includes setting the combustion engine (e.g., combustion engine 15) of the hybrid system to operate as a compressor to heat the aftertreatment system. In some examples, setting the hybrid system to compressor mode includes setting a valve-opening system (e.g., valve-opening system 20) to open to enable heated air to travel from the combustion engine to the aftertreatment system. In some embodiments, when the aftertreatment system is in the first temperature zone and the power demand determined is in the first power demand zone, at 33, setting the hybrid system to compressor mode to heat the aftertreatment system includes setting the electric heater to on to heat the aftertreatment system.

Figure 4:
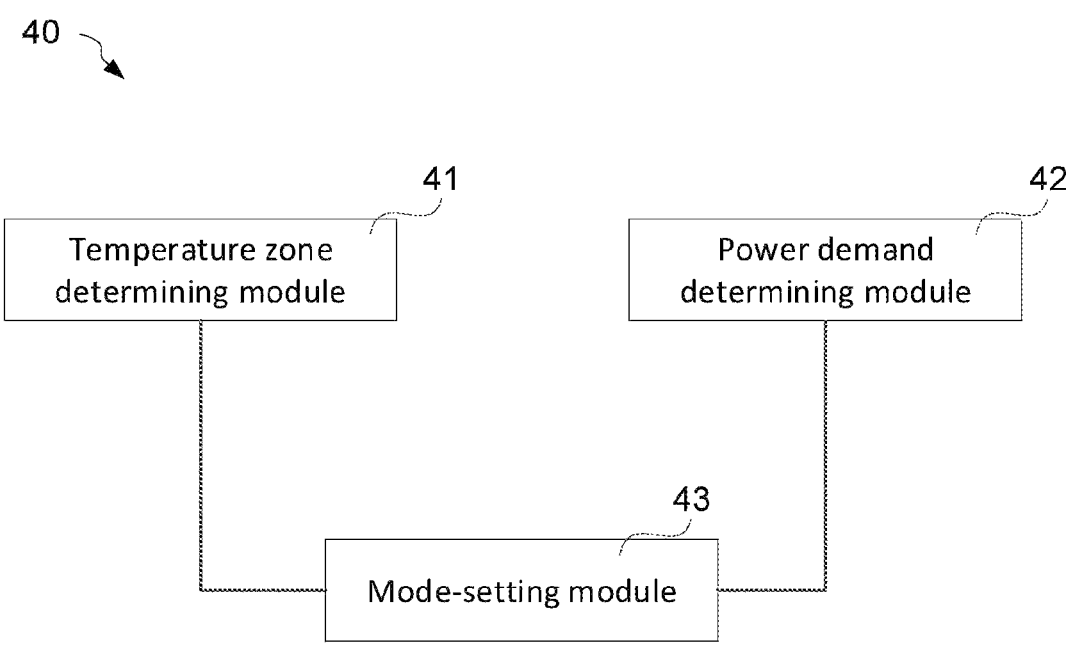
FIG. 4 is a block diagram depicting a conditioning system 40 for conditioning an aftertreatment system by implementing method 30 depicted in FIG. 2.

FIG. 4 is a block diagram depicting a conditioning system 40 for conditioning an aftertreatment system (e.g., aftertreatment system 14) by implementing method 30 depicted in FIG. 2. The conditioning system 40 includes a temperature zone determining module 41 configured to determine whether the aftertreatment system is in a first temperature zone, a power demand determining module 42 configured to determine whether a power demand corresponding to the operation of the hybrid system is in a first power demand zone, and mode-setting module 43 configured to set the hybrid system to compressor mode to heat the aftertreatment system. The conditioning system 40 may be stored in an system control unit (e.g., system control unit 13). In some examples, the conditioning system 40 is configured to condition an aftertreatment system of a hybrid system including an electric motor and a combustion engine and may be part of the hybrid system or a separate unit. The conditioning system 40 can be used with various hybrid powertrain systems including mild hybrid systems, strong hybrid systems, parallel-architecture hybrid systems, serial-architecture hybrid systems, serial-parallel-architecture hybrid systems, and/or range-extended hybrid engine systems. In some examples, the conditioning system 40 is particularly effective in reducing NOx emissions for strong hybrid engine systems than for mild hybrid engine systems. For example, a strong hybrid engine system where the electric motor is used the entire time the vehicle is running may reduce NOx emissions in a greater degree by adapting the conditioning system 40 than a mild hybrid engine system.

In various examples, the conditioning system 40 is configured to condition a SCR system or other part of the aftertreatment system, such as to raise the temperature of the SCR system or other part prior to fuel injection into the hybrid system. In certain examples, the conditioning system 40 is configured to help condition the aftertreatment system to operate at desired temperatures for optimal conversion efficiencies (see FIG. 3). In certain examples, the conditioning system 40 is configured to heat the aftertreatment system to avoid cold start, thereby reducing NOx emissions. The NOx emissions of a vehicle can be represented by the system output NOx (SONOx). In various examples, the conditioning system 40 is configured to reduce SONOx by increasing SCR conversion efficiency by conditioning the aftertreatment system, such that a greater amount of the NOx emissions of the engine of the vehicle is converted to less harming molecules. In certain examples, the conditioning system 40 is configured to control a valve-opening system (e.g., valve-opening system 20) configured to open between the combustion engine and the aftertreatment system to allow heated air the combustion engine in compressor mode to flow into the aftertreatment system and thereby heating the aftertreatment system.

In some embodiments, when the temperature of the SCR system 19 or of the aftertreatment system 14 is lower than a first temperature threshold 51 and the power demand of the hybrid system 10 is in a first power demand zone, the SCU 13 or the conditioning system 40 is configured to set the hybrid system to compressor mode and/or to set the electric heater 17 to on to heat the aftertreatment system. In the compressor mode, the electric motor of the hybrid system may drive the combustion engine as a compressor to heat up air for heating the aftertreatment system. Operating the combustion engine as a compressor entails closing the intake and exhaust valves of a combustion cavity, then turning the crankshaft to move a cylinder from bottom dead center to top dead center in the combustion cavity, thereby compressing the air enclosed in the combustion cavity to increase the air temperature, then opening the exhaust valves to allow the compressed (and heated) air to escape the combustion cavity.

In various embodiments, a computer-implemented method for conditioning an aftertreatment system of a hybrid system including an electric motor and a combustion engine includes determining whether the aftertreatment system is in a first temperature zone below a first temperature threshold; determining whether a power demand corresponding to the operation of the hybrid system is in a first power demand zone below a power threshold; and if the aftertreatment system is determined to be in the first temperature zone and the power demand of the hybrid system is determined to be in the first power demand zone, setting the hybrid system to compressor mode to heat the aftertreatment system. In some examples, the method is implemented according to the method 30 of FIG. 2 and/or implemented by the conditioning system 40 of FIG. 4.

In some embodiments, setting the hybrid system to compressor mode includes setting the combustion engine to operate as a compressor to heat the aftertreatment system.

In some embodiments, setting the combustion engine to operate as a compressor includes: setting the electric motor to operate the combustion engine as a compressor; controlling an intake valve to provide air at a first temperature to enter the combustion engine; setting the combustion engine to compress the air to heat the air to a second temperature equal to or higher than the first temperature; and controlling an exhaust valve to open and enable the heated air at the second temperature to travel from the engine to the aftertreatment system.

In some embodiments, setting the combustion engine to operate as a compressor includes controlling a valve-opening system and a fuel-injecting system such that air enters into the combustion engine and fuel is not injected into the combustion engine.

In some embodiments, determining whether the aftertreatment system is in a first temperature zone includes determining a system temperature corresponding to the aftertreatment system using a temperature sensor, such as a virtual or a physical temperature sensor.

In some embodiments, the computer-implemented method further includes, if the aftertreatment system is determined to be in the first temperature zone, setting an electric heater coupled to the aftertreatment system to heat the aftertreatment system.

In some embodiments, determining whether a power demand corresponding to the operation of the hybrid system is in a first power demand zone includes determining the power demand corresponding to the hybrid system based at least in part on an acceleration input.

In various embodiments, a conditioning system for conditioning an aftertreatment system of a hybrid system including an electric motor and a combustion engine includes a temperature zone determining module configured to determine whether the aftertreatment system is in a first temperature zone below a first temperature threshold; a power demand determining module configured to determine whether a power demand corresponding to the operation of the hybrid system is in a first power demand zone below a power threshold; and a mode-setting module configured to, if the aftertreatment system is determined to be in the first temperature zone and the power demand of the hybrid system is determined to be in the first power demand zone, set the hybrid system to compressor mode to heat the aftertreatment system. In some examples, the conditioning system is configured to implement the method 30 of FIG. 2 and/or implemented similarly to the conditioning system 40 of FIG. 4.

In some embodiments, the mode-setting module is further configured to set the combustion engine to operate as a compressor to heat the aftertreatment system.

In some embodiments, the mode-setting module is further configured to: set the electric motor to operate the combustion engine as a compressor; control an intake valve to provide air at a first temperature to enter the combustion engine; set the combustion engine to compress the air to heat the air to a second temperature equal to or higher than the first temperature; and control an exhaust valve to open and enable the heated air at the second temperature to travel from the engine to the aftertreatment system.

In some embodiments, the mode-setting module is further configured to control a valve-opening system and a fuel-injecting system such that air enters into the combustion engine and fuel is not injected into the combustion engine.

In some embodiments, the temperature zone determining module is further configured to determine a system temperature corresponding to the aftertreatment system using a temperature sensor, such as a virtual or a physical temperature sensor.

In some embodiments, the mode-setting module is further configured to, if the aftertreatment system is determined to be in the first temperature zone, set an electric heater coupled to the aftertreatment system to on to heat the aftertreatment system.

In some embodiments, the power demand determining module is further configured to determine the power demand corresponding to the hybrid system based at least in part on an acceleration input.

In various embodiments, a non-transitory computer-readable medium with instructions stored thereon, that when executed by a processor, cause the processor to perform determining whether an aftertreatment system is in a first temperature zone below a first temperature threshold, the aftertreatment system is of a hybrid system including an electric motor and a combustion engine; determining whether a power demand corresponding to the operation of the hybrid system is in a first power demand zone below a power threshold; and if the aftertreatment system is determined to be in the first temperature zone and the power demand of the hybrid system is determined to be in the first power demand zone, setting the hybrid system to compressor mode to heat the aftertreatment system. In some examples, the non-transitory computer-readable medium, when executed by a processor, cause the processor to perform the method 30 of FIG. 2. In certain examples, the non-transitory computer-readable medium is executable by the conditioning system 40 of FIG. 4.

In some embodiments, the setting the hybrid system to compressor mode performed when the non-transitory computer-readable medium is executed by the processor, includes setting the combustion engine to operate as a compressor to heat the aftertreatment system.

In some embodiments, the setting the combustion engine to operate as a compressor performed when the non-transitory computer-readable medium is executed by the processor, includes: setting the electric motor to motor the combustion engine as a compressor; controlling an intake valve to provide air at a first temperature to enter the combustion engine; setting the combustion engine to compress the air to heat the air to a second temperature equal to or higher than the first temperature; and controlling an exhaust valve to open and enable the heated air at the second temperature to travel from the engine to the aftertreatment system.

In some embodiments, the setting the combustion engine to operate as a compressor performed when the non-transitory computer-readable medium is executed by the processor, includes controlling a valve-opening system and a fuel-injecting system such that air enters into the combustion engine and fuel is not injected into the combustion engine.

In some embodiments, the determining whether the aftertreatment system is in a first temperature zone performed when the non-transitory computer-readable medium is executed by the processor, includes determining a system temperature corresponding to the aftertreatment system using a temperature sensor.

In some embodiments, the non-transitory computer-readable medium, that when executed by a processor, cause the processor to further perform, if the aftertreatment system is determined to be in the first temperature zone, setting an electric heater coupled to the aftertreatment system to on to heat the aftertreatment system.

In some embodiments, the determining whether the aftertreatment system is in a first power demand zone performed when the non-transitory computer-readable medium is executed by the processor, includes determining the power demand corresponding to the hybrid system based at least in part on an acceleration input.

It is to be understood that, for example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs operating on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the disclosure is not to be limited by the specific illustrated embodiments.

What is claimed is:

1. A computer-implemented method for conditioning an aftertreatment system of a hybrid system including an electric motor and a combustion engine, the method comprising:
   determining whether the aftertreatment system is in a first temperature zone below a first temperature threshold;
   determining whether a power demand corresponding to the operation of the hybrid system is in a first power demand zone below a power threshold; and
   if the aftertreatment system is determined to be in the first temperature zone and the power demand of the hybrid system is determined to be in the first power demand zone, setting the combustion engine of the hybrid system to compressor mode to heat the aftertreatment system, wherein the setting the hybrid system to compressor mode includes:
   setting the combustion engine to operate as a compressor to heat the aftertreatment system.

2. The computer-implemented method of claim 1, wherein the setting the combustion engine to operate as a compressor includes:
   setting the electric motor to operate the combustion engine as a compressor;
   controlling an intake valve to provide air at a first temperature to enter the combustion engine;
   setting the combustion engine to compress the air to heat the air to a second temperature equal to or higher than the first temperature; and
   controlling an exhaust valve to open and enable the heated air at the second temperature to travel from the engine to the aftertreatment system.

3. The computer-implemented method of claim 1, wherein the setting the combustion engine to operate as a compressor includes:
   controlling a valve-opening system and a fuel-injecting system such that air enters into the combustion engine and fuel is not injected into the combustion engine.

4. The computer-implemented method of claim 1, wherein the determining whether the aftertreatment system is in a first temperature zone includes:
   determining a system temperature corresponding to the aftertreatment system using a temperature sensor.

5. The computer-implemented method of claim 1, further comprising:
   if the aftertreatment system is determined to be in the first temperature zone, setting an electric heater coupled to the aftertreatment system to on to heat the aftertreatment system.

6. The computer-implemented method of claim 1, wherein the determining whether a power demand corresponding to the operation of the hybrid system is in a first power demand zone includes:
   determining the power demand corresponding to the hybrid system based at least in part on an acceleration input.

7. A conditioning system for conditioning an aftertreatment system of a hybrid system including an electric motor and a combustion engine, the conditioning system comprising:
   a system control unit of the hybrid system, the system control unit having:
   a temperature zone determining module configured to determine whether the aftertreatment system is in a first temperature zone below a first temperature threshold;
   a power demand determining module configured to determine whether a power demand corresponding to the operation of the hybrid system is in a first power demand zone below a power threshold; and
   a mode-setting module configured to, if the aftertreatment system is determined to be in the first temperature zone and the power demand of the hybrid system is determined to be in the first power demand zone, set the combustion engine of the hybrid system to compressor mode to heat the aftertreatment system;
   wherein the mode-setting module is further configured to set the combustion engine to operate as a compressor to heat the aftertreatment system.

8. The system of claim 1, wherein the mode-setting module is further configured to:
   set the electric motor to operate the combustion engine as a compressor;
   control an intake valve to provide air at a first temperature to enter the combustion engine;
   set the combustion engine to compress the air to heat the air to a second temperature equal to or higher than the first temperature; and
   control an exhaust valve to open and enable the heated air at the second temperature to travel from the engine to the aftertreatment system.

9. The system of claim 7, wherein the mode-setting module is further configured to:

control a valve-opening system and a fuel-injecting system such that air enters into the combustion engine and fuel is not injected into the combustion engine.

10. The system of claim 7, wherein the temperature zone determining module is further configured to:
determine a system temperature corresponding to the aftertreatment system using a temperature sensor.

11. The system of claim 7, wherein the mode-setting module is further configured to:
if the aftertreatment system is determined to be in the first temperature zone, set an electric heater coupled to the aftertreatment system to on to heat the aftertreatment system.

12. The system of claim 7, wherein the power demand determining module is further configured to:
determine the power demand corresponding to the hybrid system based at least in part on an acceleration input.

13. A non-transitory computer-readable medium with instructions stored thereon, that when executed by a processor, cause the processor to perform:
determining whether an aftertreatment system is in a first temperature zone below a first temperature threshold, the aftertreatment system is of a hybrid system including an electric motor and a combustion engine;
determining whether a power demand corresponding to the operation of the hybrid system is in a first power demand zone below a power threshold; and
if the aftertreatment system is determined to be in the first temperature zone and the power demand of the hybrid system is determined to be in the first power demand zone, setting the combustion engine of the hybrid system to compressor mode to heat the aftertreatment system;
wherein the setting of the hybrid system to the compressor mode performed when executed by a processor includes setting the combustion engine to operate as a compressor to heat the aftertreatment system.

14. The non-transitory computer-readable medium of claim 13, wherein the setting the combustion engine to operate as a compressor performed when executed by a processor, includes:
setting the electric motor to operate the combustion engine as a compressor;
controlling an intake valve to provide air at a first temperature to enter the combustion engine;
setting the combustion engine to compress the air to heat the air to a second temperature equal to or higher than the first temperature; and
controlling an exhaust valve to open and enable the heated air at the second temperature to travel from the engine to the aftertreatment system.

15. The non-transitory computer-readable medium of claim 13, wherein the setting the combustion engine to operate as a compressor performed when executed by a processor, includes:
controlling a valve-opening system and a fuel-injecting system such that air enters into the combustion engine and fuel is not injected into the combustion engine.

16. The non-transitory computer-readable medium of claim 13, wherein the determining whether the aftertreatment system is in a first temperature zone performed when executed by a processor, includes:
determining a system temperature corresponding to the aftertreatment system using a temperature sensor.

17. The non-transitory computer-readable medium of claim 13, that when executed by a processor, cause the processor to further perform:
if the aftertreatment system is determined to be in the first temperature zone, setting an electric heater coupled to the aftertreatment system to on to heat the aftertreatment system.

* * * * *